United States Patent [19]
Rezac

[11] 3,831,785
[45] Aug. 27, 1974

[54] SELF-UNLOADING STRUCTURE FOR WAGON BOXES

[76] Inventor: Howard D. Rezac, 403 Spencer St., Gregory, S. Dak. 57533

[22] Filed: Sept. 21, 1973

[21] Appl. No.: 399,608

[52] U.S. Cl............ 214/8.5 G, 198/164, 198/168, 214/83.36
[51] Int. Cl............................. B65g 59/06
[58] Field of Search........... 214/83.36, 83.22, 83.24, 214/8.5 G, 6 B; 198/171, 172, 173, 174, 175, 176, 168, 160, 162, 164

[56] References Cited
UNITED STATES PATENTS
1,304,026  5/1919  Craymer.................. 214/83.24
2,454,101  11/1948  Snead...................... 214/83.22

*Primary Examiner*—Robert J. Spar
*Assistant Examiner*—Donald W. Underwood
*Attorney, Agent, or Firm*—Merchant, Gould, Smith & Edell

[57] ABSTRACT

The disclosure is directed to a flat bed hauling trailer having side walls, and which is equipped with apparatus for automatically unloading material from the flat bed. The unloading apparatus comprises a plurality of elongated unloading slats or bars which are moved in spaced relation by a conveyor over the length of the bed and transverse thereto to carry the loaded material to a discharge point at the back of the trailer. To permit the trailer to be used without the unloading apparatus, the conveyor is constructed and arranged to drop the unloading slats after they have moved around the discharge point into a collecting container one at a time. The transversely movable unloading bed is reformed by placing the unloading slats into a magazine in vertical stacked relation, and releasing the slats one at a time to be picked up and moved by the conveyor in the predetermined spaced relation.

20 Claims, 8 Drawing Figures

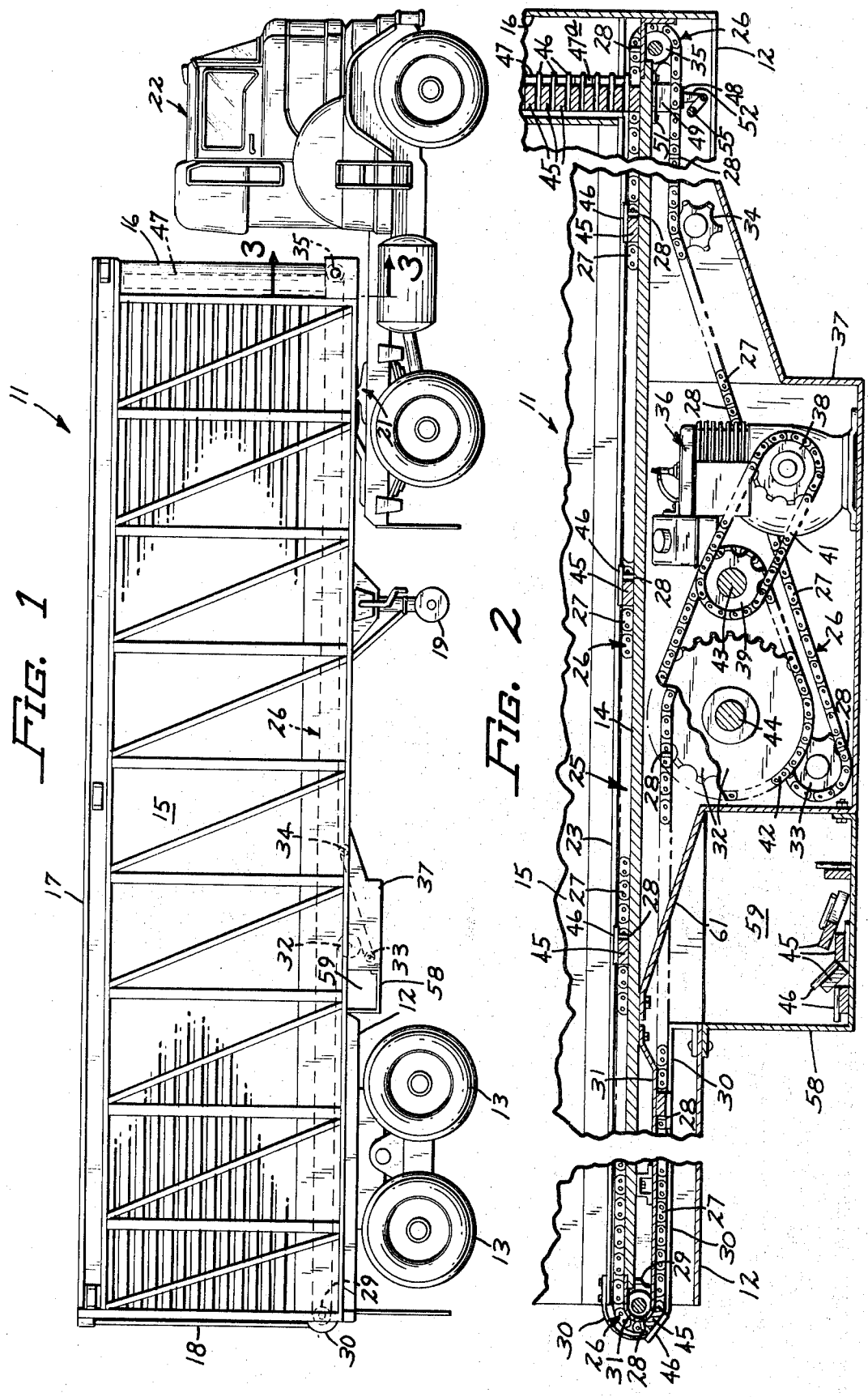

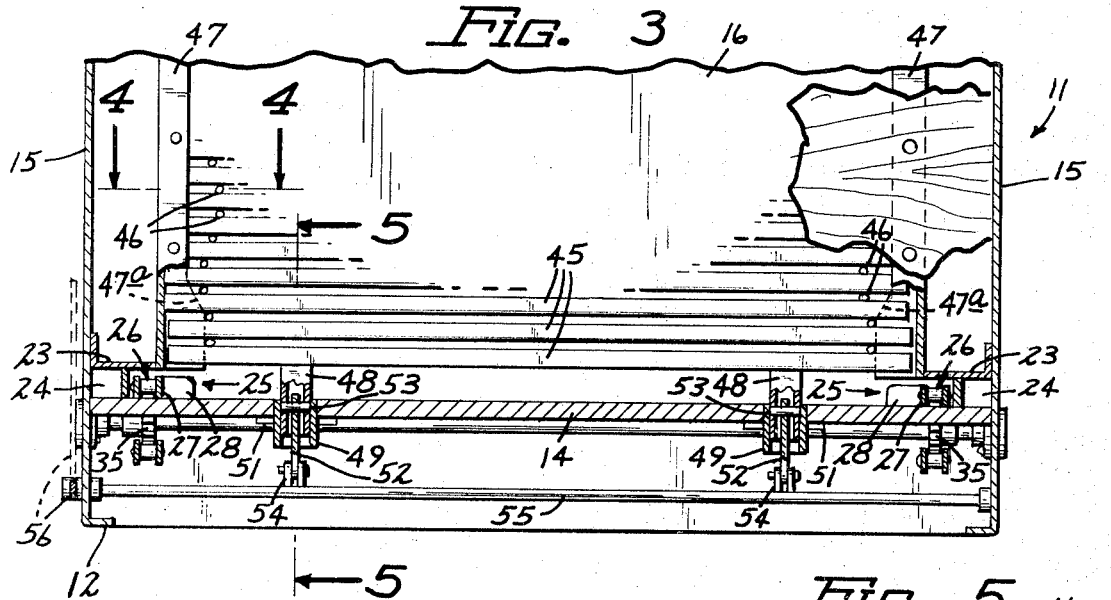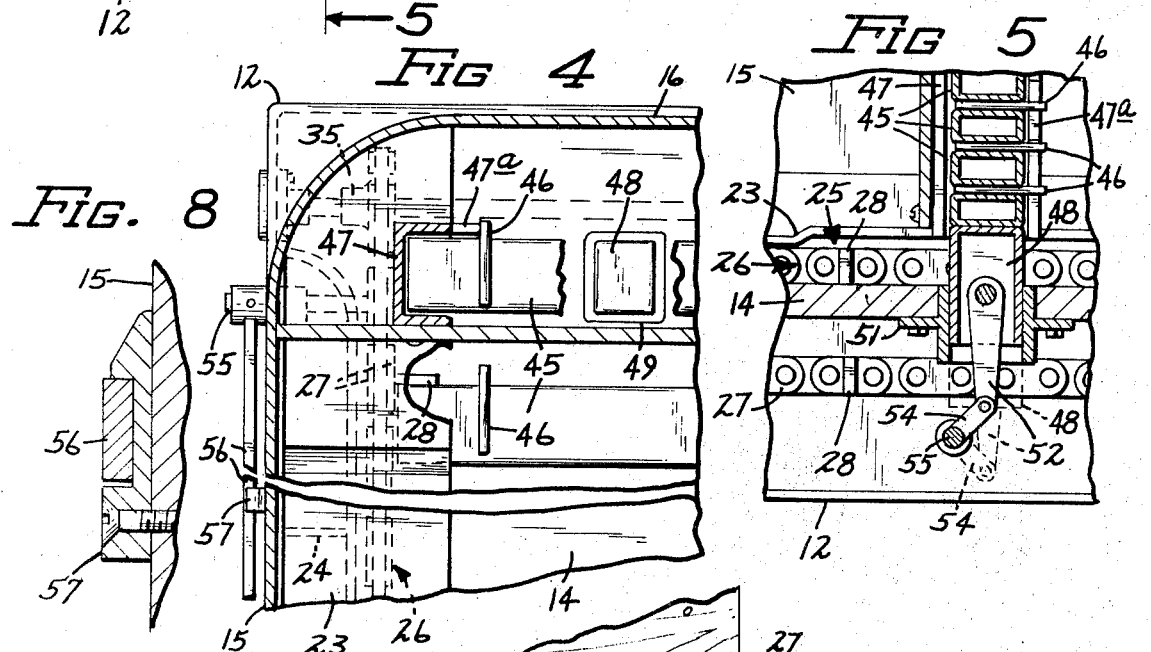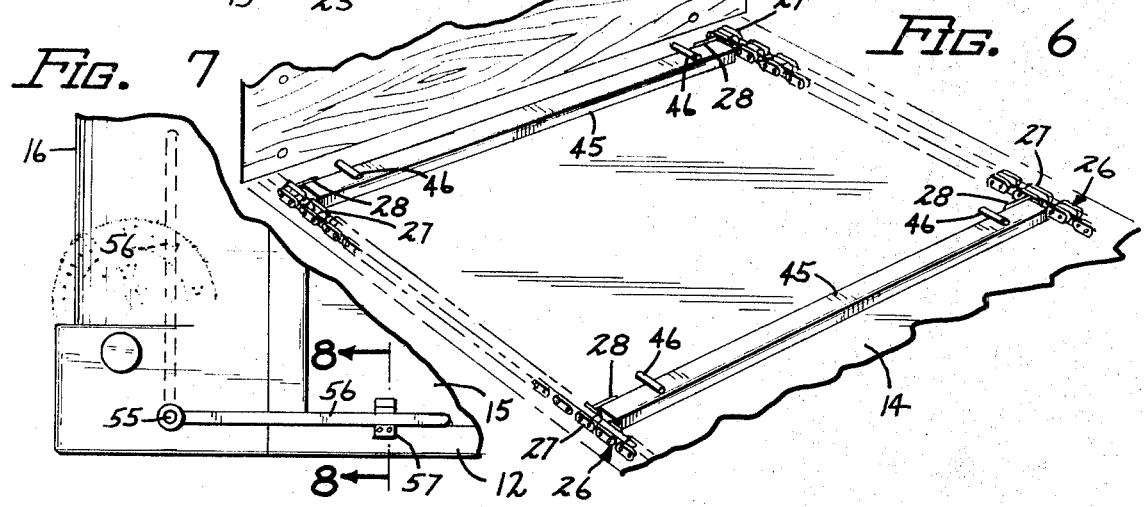

SELF-UNLOADING STRUCTURE FOR WAGON BOXES

The invention is directed to apparatus for automatically unloading material from a flat bed vehicle, and specifically contemplates such automatic unloading apparatus for a semi-trailer having side walls.

The semi-trailer is an extremely useful and versatile hauling vehicle due to its large size, capability of handling different type loads and interchangeability with different hauling tractors. The semi-trailer is, however, ordinarily difficult to unload because of its extreme length and full enclosure, particularly when the load comprises fungible goods such as corn, ground hay, bales, silage or the like. The unloading problem has been solved to some extent, at least with respect to certain type loads, by the development of apparatus capable of automatically moving the load longitudinally over the length of the trailer until it reaches a discharge point. See, for example, U.S. Pat. No. 1,304,026 issued to Henry J. Craymer on May 20, 1919; U.S. Pat. No. 2,454,101 issued to Edwin B. Snead on Nov. 16, 1948; and U.S. Pat. No. 3,578,186 issued to Henry D. Thomas on May 11, 1971.

Although the apparatus of each of the above-referenced patents permits the disclosed flat bed vehicle to be self-unloading, it will also be appreciated that the incorporation of such apparatus thereafter limits its use to loads which lend themselves to automatic unloading such as those listed above. In so doing, the vehicle is rendered incapable of carrying loads which do not so lend themselves to unloading, examples of which are livestock and freight. The versatility of the vehicle is thus lessened appreciably. It is also apparent that the above-referenced patents disclose unloading apparatus which is essentially complex in nature and requires a major modification to the trailer itself.

My invention is directed to automatic unloading apparatus for a flat bed vehicle such as semi-trailer, which permits selective use of the original trailer bed with or without the unloading feature. More specifically, I provide conveying means running the length of the trailer on each side, the upper flights thereof running at the level of the trailer bed. A plurality of elongated unloading bars or slats are constructed and arranged to be received by the conveying means in spaced relation and to be moved over the length of the trailer bed transversely thereto. The slats are moved to a discharge point at the rear of the trailer, and then carried around and under the trailer bed where they are dropped one-by-one into a collecting box for further use. The conveying means are disposed in such a manner that they do not themselves interfere with normal use of the trailer bed; and, consequently, the trailer bed returns to normal use after all of the unloading slats have been dropped into the collecting box.

The transversely movable unloading structure is easily reformed by vertically stacking the elongated slats into a magazine disposed at the forward end of the trailer. Operating in conjunction with the magazine is a slat releasing mechanism which is selectively operable to release the slats one at a time to be picked up by the conveying means as they pass relative to the magazine.

From the foregoing, it will be appreciated that a flat bed vehicle equipped with my inventive unloading apparatus can be used either in the conventional manner without interference from the unloading structure, or with the loading slats placed on the conveying means to automatically carry the load to the discharge position at the rear of the vehicle. Since the slats are arranged in spaced relation on the conveying means, they serve only to move the load which is supported by the trailer bed. Hence, material can be loaded into the trailer with the unloading slats either in place on the conveying means or in the magazine. My improved structure also permits the trailer bed to be cleaned after hauling livestock by releasing as many slats as needed from the magazine, which saves considerable time and effort.

BRIEF DESCRIPTION OF THE DRAWINGS

FIG. 1 is a side elevational view of a semi-trailer including automatic unloading apparatus embodying the inventive principle, the semi-trailer being shown in combination with a tractor;

FIG. 2 is an enlarged fragmentary sectional view of the inventive automatic unloading apparatus shown in side elevation;

FIG. 3 is an enlarged fragmentary sectional view taken along the line 3—3 of FIG. 1, portions thereof being broken away;

FIG. 4 is an enlarged fragmentary sectional view taken along the line 4—4 of FIG. 3, portions thereof broken away;

FIG. 5 is an enlarged fragmentary sectional view taken generally along the line 5—5 of FIG. 3;

FIG. 6 is a fragmentary perspective view of a portion of the automatic unloading apparatus;

FIG. 7 is an enlarged fragmentary view in side elevation of means for actuating the automatic unloading apparatus; and FIG. 8 is an enlarged fragmentary sectional view taken along the line 8—8 of FIG. 7.

DESCRIPTION OF THE PREFERRED EMBODIMENT

With initial reference to FIG. 1, a flat bed vehicle including automatic unloading apparatus embodying the inventive principle is represented generally by the numeral 11. In the preferred embodiment, the flat bed vehicle 11 is a semi-trailer comprising a horizontal frame 12 mounted on a plurality of wheels 13. With additional reference to FIG. 2, trailer frame 12 has a flat bed secured to the top thereof as well as side walls 15, a front end wall 16 and a top 17 constructed and arranged to define an open ended enclosure. The back end of semi-trailer 11 is conventionally closed by a pair of hinged doors 18.

Semi-trailer 11 further comprises a retractable front support wheel 19 and apparatus represented generally by the numeral 21 adapted for removably mounting the forward end of trailer 11 to the hauling bed of a tractor 22.

With additional reference to FIG. 3, there is secured along the bottom inner side of each of the side walls 15 an elongated L-shaped channel member 23. Channel member 23 is given under-support by a plurality of spaced metal plates 24 disposed on top of the flat bed 14 and adjacent the side walls 15. As described, the longer leg of each of the channel members 23 projects laterally inward in cantilever fashion to define an elongated recess 25 along the longitudinal sides of flat bed 14. Disposed within each of these elongated recesses 25 is the upper flight of an endless chain conveyor 26 which is adapted to slide along the top surface of flat bed 14.

With specific reference to FIG. 2, each of the endless chain conveyors 26 comprises a plurality of pivotally connected links 27 which carry inwardly projecting lugs 28 (see also FIG.3) at predetermined spaced intervals. The lugs 28 are arranged in aligned pairs for a purpose described in further detail below.

Each of the chain conveyors 26 moves around the rearmost edge of flat bed 14 and is supported relative thereto by an idler sprocket 29. Also assisting with the guided movement of chain conveyor 26 in this area is a guide plate 31, which begins at the rear edge of flat bed 14 and curves radially downward to be secured to the underside of flat bed 14. From the guide plate 31, chain conveyor 26 passes around the smaller sprocket of a double drive sprocket 32 and then reverses direction around another idler sprocket 33. The lower flight of chain conveyor 26 completes its travel around additional idler sprockets 34, 35, disposed respectively below the forward portion and at the leading forward edge of flat bed 14.

A small internal combustion engine 36 mounted in a box 37 underlying the flat bed 14 has a drive sprocket 38 which is operably connected to the larger sprocket of double drive sprocket 32 through an idler sprocket 39 and drive chains 41, 42, respectively. The size of the larger sprocket of double drive sprocket 32 relative to the size of idler sprocket 39 gives chain conveyors 26 the requisite power advantage to unload material, and also determines their proper operating speed.

Both the intermediate sprocket 39 and double drive sprocket 32 are mounted on elongated rotatable shafts 43, 44, respectively, which extend across the width of flat bed 14 and carry identical driving structure at the opposite side for the other chain conveyor 26.

Operating in association with chain conveyors 26 are a plurality of individual elongated unloading slats or bars 45, which are shown in FIGS. 2-6. As best shown in FIG. 5, unloading slats 45 are of rectangular, tubular cross section, and they are preferably formed from a suitable metal. As shown in FIG. 6, the length of each of the unloading slats 45 is commensurate with the space between the respective chain conveyors 26, thus permitting each pair of opposed dogs 28 to engage a slat 45 and thereby effect its transverse sliding movement over the length of flat bed 14. Each of the slats 45 has a pair of short rod lengths 46 secured thereto, as by welding, at predetermined points on the top surface thereof respectively spaced from the ends.

With reference to FIGS. 2-5, a vertical magazine for holding the individual unloading slats 45 in stacked relation is defined by a pair of opposed vertical channel members 47 disposed at the forward end, of the flat bed 14. More specifically, the channel members 47 are disposed between the chain conveyors 26 (FIGS. 3 and 4), slightly rearwardly of the forward idler sprockets 35 (FIGS. 2 and 4). As best shown in FIG. 4, each of the channel members 47 is of a U-shaped cross section sized to receive and retain one end of an individual unloading slat 45. As shown particularly in FIG. 3, the lower portion of the front side of each channel member 47 is widened, defining an inclined edge 47a. The distance between the respective widened portions of the channel members 47 is just greater than the distance between the rod length 46 of each unloading slat 45, thus causing each of the slats 45 to become perfectly centered as it reaches the bottom of the magazine. The bottom of each of the channel members 47 rests on the top surface of the cantilevered leg of the associated channel member 23, and it will therefore be appreciated that each of the unloading slats 45 can be dropped in a predetermined position on the flat bed 14 to be picked up and thereafter transversely moved over its length by an opposed pair of lugs 28. As each unloading slat 45 is carried away, the slat 45 next above falls onto the top surface of flat bed 14 and it picked up by the next succeeding opposed pair of lugs 28. As each unloading slat 45 is carried away, the slat 45 next above falls onto the top surface of flat bed 14 and is picked up by the next succeeding opposed pair of lugs 28.

With continued reference to FIGS. 2-5, the selective dropping of slats 45 onto flat bed 14 for transverse movement by the conveyor chains 26 is controlled by a pair of plungers 48 which are disposed directly below the unloading slats 45. Plungers 48 project through openings in the flat bed 14, and are cooperably movable between a lower position flush with or lower than the top surface of flat bed 14, and an upper position (as shown in FIG. 3) in which the plunger 48 engages the lower most unloading slat 45 above the top surface of flat bed 14 and thereby prevents it from being picked up by the chain conveyors 26.

With specific reference to FIGS. 4 and 5, each of the plungers 48 take the shape of a square piston the bottom of which is open. Each plunger 48 slides within a guiding sleeve 49 having a peripheral flange 51 secured to the underside of flat bed 14 by screws or the like. A connecting link 52 is received within the hollow portion of each plunger 48 and pivotally connected thereto by a wrist pin 53. The actuating links 54 are rigidly connected at identical angular positions to an elongated rod 55 rotatably supported by the inner side walls 15. One end of the elongated rod 55 projects through its associated side wall 15 and has a handle 56 secured thereto.

With reference to FIGS. 5 and 7, handle 56 is disposed in a vertical position with the plungers 48 retracted to the level of the top surface of flat bed 14, and its rotation to the horizontal position moves the plungers 48 through links 52 and 54 (FIG. 5) to the upper slat retaining position shown in FIG. 3. With additional reference to FIG. 8, handle 56 is retained in the horizontal position by a notched member 57 secured to the side wall 15. The upper face of member 57 is beveled to facilitate entry of the handle 56 into the appropriately shaped notch. Handle 56 is released by pulling it outward away from the notch and rotating it counter-clockwise.

As described, it will be appreciated that movement of the handle 56 to the vertical position enables the unloading slats 45 to be picked up by the conveyor chains 26 one by one, as long as the chains 26 are moving. Rotation of the handle 56 to the vertical position extends the plungers 48 to the uppermost position, thus stopping the supply of unloading slats 45 to the conveyor chains 26.

With specific reference to FIG. 2, a thick metal plate 58 of L-shaped cross section is secured to the engine box 37 and also to a portion of the trailer understructure to define a storage compartment 59. Storage compartment 59 has a transverse dimension sufficient to receive unloading slats 45 as they pass beyond the forwardmost point of guide plate 30.

Because there is nothing more than abutting engagement of each unloading slat 45 by the chain lugs 28, each slat 45 ordinarily falls by gravity into the storage container 59 as soon as it leaves the supporting surface of the guide plate 30. However, to insure that each slat 45 is carried no further than the storage container 59, there is provided an elongated plate 61 over the storage container 59 which projects upwardly and rearwardly from the back side of engine box 37 and is bolted to the undersurface of flat bed 14. Openings (not shown) are formed through the plate to permit the passage of chain conveyor 26. As disposed, any slat 45 that does not drop into storage container 59 immediately after leaving guide plate 30 strikes the plate 61 and is thereby dropped into the container 59.

In the overall operation of the inventive unloading apparatus, handle 56 is rotated to its horizontal position to extend plungers 48 to their uppermost position. The unloading slats 45 are thereafter vertically stacked between the channel members 47 by insertion from the top one at a time.

Assuming the semi-trailer 11 has been loaded with hay or the like and is in a proper position for discharge, engine 36 is started and engaged to begin the endless movement of conveyor chains 26. Handle 56 is then released from the notched retaining member 57 and moved to its vertical position, thereby retracting plungers 48 and dropping the lowermost slat 45 to the upper surface of flat bed 14. The slats 45 are thereafter picked up and moved transversely in spaced relation, carrying the load longitudinally with them to the discharge point at the rear of the trailer 11. The slats 45 thereafter continue around and under the flat bed 14, at which point they are supported by the guide plate 30 until they are dropped into the storage container 59.

After the unloading operation has been completed, handle 56 is returned to and retained in its horizontal position, thus precluding the further pick-up of slats 45 by conveyor chain 26. It will be appreciated that each and every one of the slats 45 is eventually dumped into the storage container 59, thus leaving the flat bed 14 free and clear to receive any type load.

I claim:

1. Automatic unloading apparatus for a flat bed vehicle of predetermined length, comprising:
   a. a plurality of individual elongated unloading members;
   b. conveyor means for engaging and moving said unloading members transversely over at least a part of the length of the flat bed in spaced relation to a predetermined discharge point;
   c. said conveyor means being further constructed and arranged to be disengaged from the unloading members and permitting them to drop one at a time to a collecting area beyond the discharge point;
   d. and means for storing said unloading members and for depositing said members one at a time relative to the conveyor means for engagement thereby and so they can be moved in said spaced relation.

2. The unloading apparatus defined by claim 1, wherein the conveyor means is endless, defining an upper flight movable over the top of the flat bed and a lower flight movable below the flat bed.

3. The apparatus defined by claim 2, wherein the conveyor means is constructed to move the unloading members rearwardly over the flat bed length, and the discharge point is disposed at the rearwardmost portion of the flat bed.

4. The apparatus defined by claim 3, wherein the collecting area is disposed below the flat bed forwardly of the discharge point.

5. The apparatus defined by claim 4, and further comprising means mounted on the underside of the flat bed for abuttably engaging and urging the unloading members into the collecting area.

6. The apparatus defined by claim 2, wherein the conveyor means comprises first and second endless conveyors respectively disposed along each side of the flat bed and arranged to move said individual elongated members therebetween.

7. The apparatus defined by claim 6, and further comprising means defining a covered recess extending along each side of the flat bed top surface, the upper flights of the first and second endless conveyors being respectively disposed in the covered recesses.

8. The apparatus defined by claim 6, wherein each of the endless conveyors further comprises a plurality of carrying members longitudinally disposed in said spaced relation, the carrying members of the first and second endless conveyors being together arranged in opposed pairs to receive and carry said unloading members.

9. The apparatus defined by claim 8, wherein:
   a. the carrying members comprise lugs secured to the endless conveyors and projecting laterally inward therefrom;
   b. and each unloading member is adapted to slide over the flat bed and is sized to fit between a pair of lugs to be abuttably engaged and moved thereby.

10. The apparatus defined by claim 4, wherein:
    a. the upper flight of the conveyor means is constructed and arranged to abuttably engage and slide the unloading members over the top surface of the flat bed;
    b. and further comprising guide means associated with the lower flight between the discharge point and the collecting area to guide each unloading member and to prevent it from falling from the conveyor means before it reaches the collecting area.

11. The apparatus defined by claim 10, wherein the guide means comprises a plate spaced from the flat bed to receive the conveyor means therebetween, the plate having a curved portion extending around the discharge point and a flat portion terminating at the collecting area.

12. The apparatus defined by claim 10, and further comprising an elongated container disposed at the collecting area for receiving the unloading members as they are dropped from the conveyor means.

13. The apparatus defined by claim 1, wherein:
    a. the conveyor means is constructed and arranged to abuttably engage and slide the unloading members over the top surface of the flat bed;
    b. and the storing and depositing means comprises a magazine for holding the unloading members in vertical stacked relation with the bottom-most unloading member resting on the top surface of the flat bed in a position for abuttable engagement by the conveyor means.

14. The apparatus defined by claim 13, in which the storing and depositing means further comprises means for elevating the bottom-most unloading member from the top surface of the flat bed to preclude its abuttable engagement by the conveyor means.

15. The apparatus defined by claim 14, wherein the elevating means comprises plunger means mounted relative to the flat bed for selective movement between an extended position to elevate the bottom-most unloading member and a retracted position permitting abuttable engagement of the bottom-most unloading member by the conveyor means.

16. The apparatus defined by claim 13, wherein the plunger means comprises:
   a. at least one reciprocally mounted plunger;
   b. a rotatable shaft;
   c. a linkage member rigidly secured to the shaft and pivotally connected to the plunger;
   d. and handle means for rotating the shaft to thereby effect relative positioning of the plunger.

17. The apparatus defined by claim 16, and further comprising handle retention means for releasably holding the handle means in a position corresponding to the extended plunger position.

18. The apparatus defined by claim 13, wherein the magazine comprises first and second vertical channel members disposed in opposed relation, each channel member constructed to receive and guide one end of an unloading member.

19. The apparatus defined by claim 18, wherein:
   a. the conveyor means comprises first and second endless conveyors respectively disposed along each side of the flat bed and arranged to move the individual elongated member therebetween, each endless conveyor defining an upper flight movable over the top of the flat bed and a lower flight movable below the flat bed;
   b. and further comprising means for centering each unloading member between the first and second endless conveyors as it reaches the bottom-most position in the magazine.

20. The apparatus defined by claim 19, wherein:
   a. each of said vertical channel members includes a guiding surface for the unloading member which includes downward and laterally inward toward the top surface of the flat bed;
   b. and each of said unloading members further comprises a centering member for each guiding surface, the centering members being respectively spaced inward from the ends of the unloading member for centering engagement by the inclined guiding surface as the unloading member drops to the bottom-most position in the magazine;
   c. said guiding surface and said centering members defining the centering means.

* * * * *